US012791055B2

(12) United States Patent
Ide et al.

(10) Patent No.: US 12,791,055 B2
(45) Date of Patent: Nov. 10, 2026

(54) BUSH MEMBER

(71) Applicant: DAIDO METAL COMPANY LTD., Nagoya (JP)

(72) Inventors: Atsuko Ide, Inuyama (JP); Fuma Nezaki, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 86 days.

(21) Appl. No.: 18/954,269

(22) Filed: Nov. 20, 2024

(65) Prior Publication Data

US 2025/0163954 A1 May 22, 2025

(30) Foreign Application Priority Data

Nov. 22, 2023 (JP) ................................ 2023-198259

(51) Int. Cl.
*F16C 9/04* (2006.01)

(52) U.S. Cl.
CPC ............ *F16C 9/04* (2013.01); *F16C 2202/04* (2013.01); *F16C 2204/14* (2013.01)

(58) Field of Classification Search
CPC ..... F16C 9/04; F16C 2202/04; F16C 2204/14
See application file for complete search history.

(56) References Cited

U.S. PATENT DOCUMENTS 6,964,713 B2 * 11/2005 Fujita ........................ C22C 9/04 420/482
8,790,574 B2 * 7/2014 Toda ....................... F01D 25/16 420/482
11,333,198 B2 5/2022 Hanai
2017/0314098 A1 11/2017 Ebata et al.
2023/0357894 A1 11/2023 Kuhn et al.

FOREIGN PATENT DOCUMENTS

JP H1030137 A 2/1998
JP 2021050398 A 4/2021
KR 20130005164 A 1/2013
WO 2018174259 A1 9/2018

OTHER PUBLICATIONS

Hypoeutectoid Steel: Properties and Key Applications, May 21, 2025, https://metalzenith.com/blogs/steel-properties/hypoeutectoid-steel-properties-and-key-applications, table 3.2.*
Japanese Office Action dated Jun. 24, 2025, for Japanese Patent Application No. 2023-198259.
Japanese Office Action dated Sep. 9, 2025, for Japanese Patent Application No. 2023-198259.
Extended European Search Report dated Apr. 9, 2025, for European Patent Application No. 24207615.6.

* cited by examiner

*Primary Examiner* — James Pilkington
(74) *Attorney, Agent, or Firm* — KARCESKI IP LAW, PLLC

(57) ABSTRACT

A bush member includes an Fe-based back metal layer, and a bearing alloy layer joined to the back metal layer. The bearing alloy layer is formed of a Cu-based alloy containing 25 to 45% by mass of Zn and has a Vickers hardness of 150 to 230 HV, and the back metal layer has a Vickers hardness of 160 to 240 HV.

3 Claims, 6 Drawing Sheets

Fig.3

| | | Heating Time (hr) | | | | |
|---|---|---|---|---|---|---|
| | | 0 | 80 | 160 | 360 | 500 |
| Rate of change in pull-out load | Example 1 | 1.00 | 1.21 | 1.15 | 1.20 | 1.44 |
| | Comparative Example 1 | 1.00 | 0.36 | 0.24 | 0.21 | 0.16 |

Fig.4

| | Material | Surface area | Mass change | Mass change /Surface area |
|---|---|---|---|---|
| | | $mm^2$ | mg | $\times 10^{-3}$mg/mm2 |
| Example 2 | Zn40% Brass | 648 | 0.1 | 0.15 |
| Example 3 | Zn35% Brass | 618 | 0.1 | 0.16 |
| Example 4 | Zn25% Brass | 619 | 0.3 | 0.48 |
| Comparative Example 2 | Zn20% Brass | 628 | 1.1 | 1.75 |
| Comparative Example 3 | Bronze | 627 | 12.4 | 19.8 |

Fig.5

| | Material | Alloy layer hardness (HV) | Back metal layer hardness (HV) | Processibility | Fatigue resistance (Mpa) |
|---|---|---|---|---|---|
| Example 5 | Zn40% Brass | 154 | 162 | ◎ | 170 |
| Example 6 | Zn40% Brass | 182 | 200 | ◎ | 180 |
| Example 7 | Zn40% Brass | 201 | 220 | ◎ | 190 |
| Example 8 | Zn40% Brass | 220 | 205 | ◎ | 200 |
| Example 9 | Zn40% Brass | 211 | 174 | ○ | 200 |
| Comparative Example 4 | Zn40% Brass | 223 | 248 | × | — |
| Comparative Example 5 | Zn40% Brass | 138 | 152 | ◎ | 150 |
| Comparative Example 6 | Zn40% Brass | 145 | 155 | ◎ | 150 |

Fig.6

| | |
|---|---|
| Load | 100MPa～200MPa |
| Frequency | 50Hz |
| Lubricating oil | Engine oil |
| Oil pressure | 0.5MPa |
| Counterpart shaft material | S55C |
| Counterpart shaft roughness | Ra 0.05 |

BUSH MEMBER

CROSS-REFERENCE TO RELATED APPLICATION(S)

This Non-Provisional United States Patent Application relies on and claims priority to Japanese Patent Application No. 2023-198259, filed on Nov. 22, 2023, the entire contents of which are incorporated herein by reference.

FIELD OF THE INVENTION

The present embodiment relates to a bush member for use in a piston pin.

DESCRIPTION OF RELATED ART

Conventionally, as a bush member for use in a piston pin, there has been known a Cu-based sliding member as disclosed in, for example, Japanese Patent Laid-Open No. 10-30137. In the sliding member disclosed in Japanese Patent Laid-Open No. 10-30137, brass with a high Zn content is used as a bearing alloy layer. Accordingly, the sliding member of Japanese Patent Laid-Open No. 10-30137 ensures corrosion resistance against sulfur components that are generated as the temperature rises in the combustion chamber.

However, the load applied to the piston pin increases with the rise of the temperature in the combustion chamber, and a further increase in strength of the bush member is required. Furthermore, by forming the bush member as a single layer of a brass bearing alloy layer, unlike the bimetal as in Japanese Patent Laid-Open No. 10-30137, strength such as fatigue resistance is ensured. However, single layer bush members have the problem that they are more affected by creep in environments under high load.

Therefore, an object of the present invention is to provide a bush member having high strength and corrosion resistance while reducing an effect of creep.

SUMMARY OF THE INVENTION

In order to solve the above-described problem, a bush member according to one embodiment is a bush member for use in a piston pin, including an Fe-based back metal layer, and a bearing alloy layer joined to the back metal layer. The bearing alloy layer is formed of a Cu-based alloy containing 25 to 45% by mass of Zn and has a Vickers hardness of 150 to 230 HV, and the back metal layer has a Vickers hardness of 160 to 240 HV.

Accordingly, in the bush member according to one embodiment, the bearing alloy layer is joined to the Fe-based back metal layer. Therefore, the effect of creep on the bearing alloy layer is reduced by the integral back metal layer. Further, the bush member according to one embodiment is made of a Cu-based alloy containing Zn that is brass. Therefore, the bush member has high resistance to sulfur components due to the additives contained in the lubricating oil, and corrosion due to the sulfur components is reduced. Furthermore, in the bush member according to one embodiment, the hardnesses of the bearing alloy layer and the back metal layer are set. Therefore, fatigue resistance is improved while processibility for ensuring high dimensional accuracy and roundness accuracy is maintained. Accordingly, it is possible to enhance strength and corrosion resistance while maintaining the creep characteristics.

BRIEF DESCRIPTION OF THE DRAWINGS

FIG. 3 is a table showing verification results of creep characteristics in an example of the bush member according to one embodiment and a comparative example;

FIG. 4 is a table showing verification results of corrosion resistance in examples of the bush member according to one embodiment and comparative examples;

FIG. 5 is a table showing verification results of fatigue resistance in examples of the bush member according to one embodiment and comparative examples; and FIG. 6 is a table showing test conditions of a fatigue resistance test.

DESCRIPTION OF EMBODIMENT(S) OF THE INVENTION

Hereinafter, one embodiment of a bush member for use in a piston pin will be described in detail based on the drawings.

Figure 1:
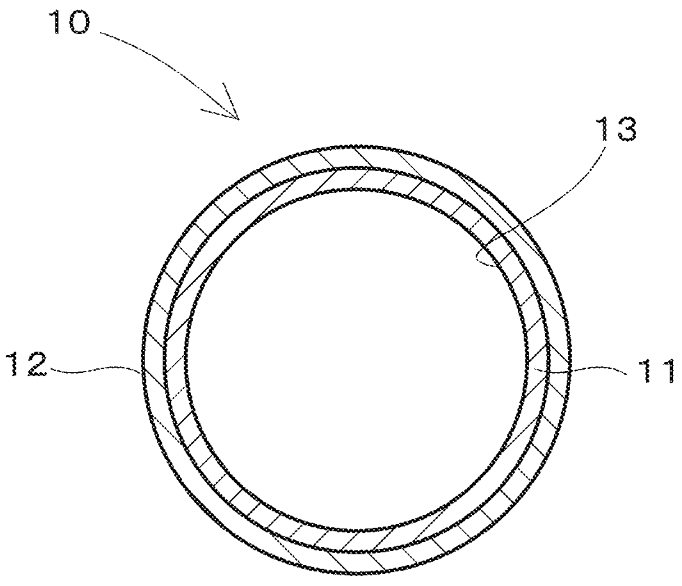
FIG. 1 is a schematic sectional view showing a bush member according to one embodiment.

As shown in FIG. 1, a bush member 10 includes a bearing alloy layer 11 and a back metal layer 12. The bush member 10 is used in a piston pin that connects a piston and a connecting rod of an internal combustion engine not shown. The bush member 10 is formed in a cylindrical shape, with the bearing alloy layer 11 located on an inner circumferential side, and the back metal layer 12 located on an outer circumferential side. A surface of the bearing alloy layer 11, that is, an inner circumferential surface of the bush member 10 forms a sliding surface 13 that slides against a counterpart member.

The back metal layer 12 is formed of, for example, an Fe-based alloy such as steel. The back metal layer 12 has a Vickers hardness of 160 to 240 HV. Note that in the present specification, an upper limit value and a lower limit value that indicate a range of a numeric value are both included in the range. When the Vickers hardness of the back metal layer 12 is less than 160, it becomes difficult to ensure fatigue resistance required for the bush member 10 of a piston pin. On the other hand, when the Vickers hardness of the back metal layer 12 exceeds 240 HV, processibility is decreased.

The bearing alloy layer 11 is integrally joined to the back metal layer 12 and is formed of a Cu-based alloy containing 25 to 45% by mass of Zn. That is to say, the bearing alloy layer 11 is formed of brass. In order to ensure higher corrosion resistance, Zn contained in the bearing alloy layer 11 is preferably 35 to 45% by mass. The bearing alloy layer 11 may contain additive elements such as Sn and P in addition to Zn. Note that in the case of the bush member 10 of the present embodiment, the bearing alloy layer 11 is preferably formed of an alloy of Zn and Cu except for unavoidable impurities.

The bearing alloy layer 11 has a Vickers hardness of 150 to 230 HV. When the Vickers hardness of the bearing alloy layer 11 is less than 150 HV, it becomes difficult to ensure the fatigue resistance required for the bush member 10 of a piston pin. On the other hand, when the Vickers hardness of the bearing alloy layer 11 exceeds 230 HV, processibility is decreased, and seizure resistance is also decreased.

The Vickers hardness of the back metal layer 12 is preferably more than or equal to 0.9 times the Vickers hardness of the bearing alloy layer 11. In the case of the present embodiment, the bearing alloy layer 11 and the back metal layer 12 preferably have similar hardnesses, and it is more preferable that the back metal layer 12 is slightly harder than the bearing alloy layer 11. As above, since the hardnesses of the bearing alloy layer 11 and the back metal layer 12 are similar, it is possible to facilitate processing that ensures roundness during processing of the bush member 10. Furthermore, when the hardnesses of the bearing alloy layer 11 and the back metal layer 12 are excessively high, for example, a process of press-fitting the bush member 10 into the connecting rod and a machining process after press-fitting may become difficult. Therefore, the Vickers hardnesses of the bearing alloy layer 11 and the back metal layer 12 are set with 240 HV as an upper limit.

Next, a method for manufacturing the bush member 10 according to the above-described configuration will be described.

Figure 2:
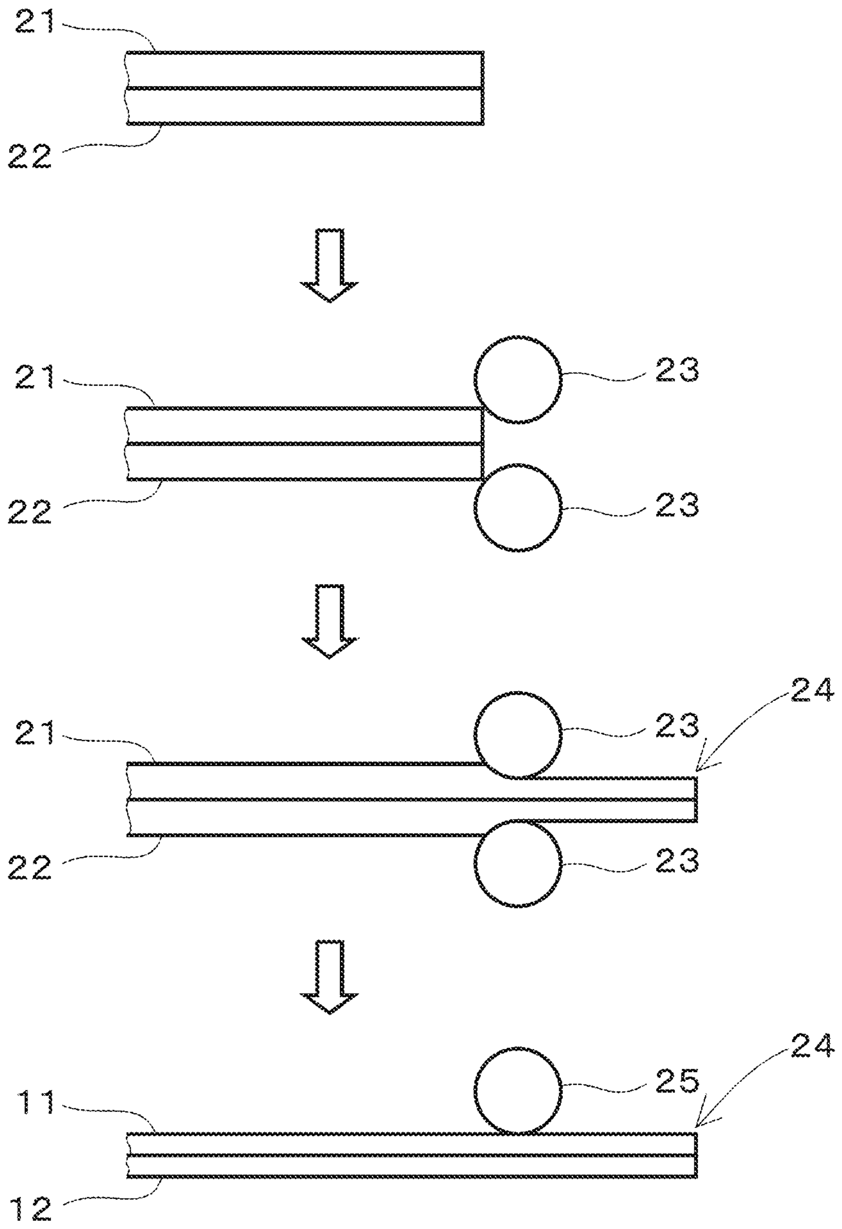
FIG. 2 is a schematic view showing a flow of manufacture of the bush member according to one embodiment.

As shown in FIG. 2, the bush member 10 is manufactured by roll-welding a plate member 21 to be the bearing alloy layer 11 and a plate member 22 to be the back metal layer 12. After the plate member 21 and the plate member 22 are laid on each other, they are pressed by rollers 23 until a total of thicknesses thereof becomes 40 to 60%.

A laminated material 24 joined by pressurization is heated to 550 to 680° C. to be subjected to diffusion annealing. By this heating, joining by diffusion is promoted between the plate member 21 and the plate member 22 in the laminated material 24, and the plate member 21 and the plate member 22 are firmly joined. On the other hand, due to diffusion annealing, a hardness of the plate member 21 to be the bearing alloy layer 11 is reduced. As described above, when the Vickers hardness of the bearing alloy layer 11 is less than 150 HV, it becomes difficult to ensure fatigue resistance of the bearing alloy layer 11. Therefore, the heated laminated material 24 is pressed by a roller 25 until the total thickness becomes 3 to 30%. At this time, the pressurization process may be in one stage, or in two stages or more. In this case, the roller 25 may mainly pressurize the plate member 21 to be the bearing alloy layer 11 of the laminated material 24 or may press the laminated material 24 from both surfaces thereof. Accordingly, the formed bearing alloy layer 11 is hardened to a Vickers hardness of 150 HV or more.

From the above, the plate member 21 to be the bearing alloy layer 11 and the plate member 22 to be the back metal layer 12 are formed to be the laminated material 24 in which they are joined together. The laminated material 24 is formed into the cylindrical bush member 10. In the method for manufacturing the bush member 10 according to the present embodiment, the plate member 21 to be the bearing alloy layer 11 and the plate member 22 to be the back metal layer 12 are joined by pressurization. Therefore, the manufacturing process of the bush member 10 does not include, for example, a process such as quenching that causes the back metal layer 12 to have a hard and brittle structure. As a result, in the method for manufacturing the bush member 10 according to the present embodiment, brittleness of the manufactured bush member 10 can be reduced, and strength can be increased. Since the back metal layer 12 of the bush member 10 manufactured by the method for manufacturing the present embodiment has a Vickers hardness less than or equal to 240 HV, processibility is enhanced. Accordingly, the formed bush member 10 can be formed in a cylindrical shape with high dimensional accuracy and shape accuracy. With this, the bush member 10 can be enhanced in processibility in press-fitting into the connecting rod, and machining and polishing that are applied after being press-fitted, for example.

Next, examples of the bush member 10 according to the above-described embodiment will be described.

Verification of Creep Characteristics

As shown in FIG. 3, in Example 1 of the bush member 10, the bearing alloy layer 11 and the back metal layer 12 are laminated as described above. In contrast, in Comparative Example 1 for comparison, a part corresponding to the back metal layer 12 is also formed of brass to be the bearing alloy layer 11 by one single layer, although Comparative Example 1 has the same size as Example 1. That is to say, Comparative Example 1 is a so-called solid material that is entirely formed of brass.

In the bush members 10 of Example 1 and Comparative Example 1, creep characteristics were verified by using pull-out load. The pull-out load is load that is required to pull out the bush member 10 from a counterpart member after the bush member 10 is press-fitted into the counterpart member. The bush members 10 of Example 1 and Comparative Example 1 that were press-fitted into the counterpart members were heated to 190° C. and after the preset heating time elapsed, they were cooled to a room temperature. After they were cooled, the pull-out load of each of the bush members 10 of Example 1 and Comparative Example 1 was measured. FIG. 3 shows the rate of change of the pull-out load after heating when the pull-out load before heating was set as "1.00".

As is obvious from FIG. 3, in Example 1, the change in pull-out load is small, although the pull-out load tends to increase as the heating time increases. On the other hand, in Comparative Example 1, as the heating time increases, the pull-out load remarkably decreases. Thus, it is shown that the bush member 10 of Example 1 is less affected by creep as compared with that of Comparative Example 1. This is because the bush member 10 of Example 1 includes the Fe-based back metal layer 12 that is less affected by creep on the outer circumferential side of the bearing alloy layer 11. In contrast to this, it is found that Comparative Example 1 that is integrally formed of brass is more affected by creep. Note that in the bush member 10 of the present embodiment, the bearing alloy layer 11 and the back metal layer 12 are joined to each other. Therefore, the percentage content of Zn in the bearing alloy layer 11 does not affect the creep of the bush member 10. Accordingly, the bearing alloy layer 11 of the bush member 10 of the present embodiment can reduce the effect of creep irrespective of the percentage content of Zn.

Verification of Corrosion Resistance

The corrosion resistance of the bush member 10 was verified by using Example 2 to Example 4, Comparative Example 2, and Comparative Example 3 as shown in FIG. 4. In each of Example 2 to Example 4, the percentage content of Zn in the bearing alloy layer 11 made of brass is controlled. Further, in Comparative Example 2 for comparison, the percentage content of Zn contained in the bearing alloy layer 11 is lower as compared with those in Example 2 to Example 4. In Comparative Example 3, the bearing alloy layer made of bronze to which Sn is added instead of Zn is used.

For each of the specimens of Example 2 to Example 4, Comparative Example 2, and Comparative Example 3, the corrosion resistance was verified from the change in mass of each of the specimens. The change in mass increases as corrosion in each of the specimens progresses. In other words, the mass of each of the specimens decreases as corrosion progresses. However, since progress of corrosion depends on the surface area of each of the specimens, it is difficult to accurately grasp the amount of corrosion in each of the specimens by only measuring the change in mass. Thus, in each of the specimens, the change in mass per surface area was measured as the amount of corrosion.

The corrosion resistance of each of the specimens was verified by immersing each of the specimens in the lubricating oil at 190° C. for 70 hours, which is similar to the operating conditions of an internal combustion engine, in the sealed container. As the lubricating oil, several types of commercially available genuine products specified by the internal combustion engine manufacturer were used. To these lubricating oils, the additive containing sulfur components in the molecules is added, for the purpose of, for example, improving performance and maintaining quality. The additive may be decomposed as the temperature rises due to increasing severity of the operating conditions in the internal combustion engines, which causes generation of sulfur components contained in the molecules. These generated sulfur components cause corrosion in the bearing alloy layer 11 of the bush member 10.

As is obvious from FIG. 4, it is found that Examples 2 to 4 in which the percentage contents of Zn contained in the bearing alloy layers 11 are more than or equal to 25% have corrosion resistance higher than Comparative Example 2 in which the percentage content of Zn is 20%. Furthermore, it is found that in Comparative Example 3 using the bearing alloy layer made of bronze, corrosion progresses more easily as compared with Example 2 to Example 4. From the above, the bush member 10 of the present embodiment in which the percentage content of Zn is more than or equal to 25% can be enhanced in corrosion resistance. In particular, as is known from comparison of Example 2 and Example 3, and Example 4, the bush member 10 in which the percentage content of Zn is more than or equal to 35% can be more enhanced in corrosion resistance.

Verification of Fatigue Resistance

The fatigue resistance of the bush member 10 was verified by using Example 5 to Example 9, and Comparative Example 4 to Comparative Example 6 as shown in FIG. 5. In Example 5 to Example 9 and Comparative Example 4 to Comparative Example 6, the hardnesses of the bearing alloy layers 11 and the hardnesses of the back metal layers 12 were controlled to verify the fatigue resistance. Further, FIG. 5 also shows the evaluation of processibility of the bush member 10 in addition to the fatigue resistance.

For each of Example 5 to Example 9 and Comparative Example 4 to Comparative Example 6, the fatigue resistance was measured based on the test conditions shown in FIG. 6. The fatigue resistance was measured based on the load at which fatigue occurred by applying loads repeatedly to the specimens while lubricating them with lubricating oil under the conditions shown in FIG. 6. The lubricating oil is the commercially available lubricating oil for an internal combustion engine exemplified in the above. The load applied to each of the specimens was started at 100 MPa, was increased by 10 MPa each time fatigue resistance was confirmed, and was set up to 200 MPa. In terms of fatigue resistance, the specimen is deemed to have passed the test if the load causing fatigue is more than or equal to 170 MPa. Processibility is evaluated based on whether or not the bush member 10 formed of the bearing alloy layer 11 and the back metal layer 12 can be processed to such an extent that it can ensure suitable dimensional accuracy and roundness. In terms of processibility, the specimen that was able to ensure suitable processing but had a low yield was rated as "Good: ○", the specimens that ensured suitable processing and had a high yield were rated as "Excellent: ◎", and the specimen that was difficult to process properly was rated as "Poor: x".

As shown in FIG. 5, in each of Example 5 to Example 9, the hardness of the bearing alloy layer 11 is 150 to 230 HV, and the hardness of the back metal layer 12 is 160 to 240 HV. Further, in each of Example 5 to Example 8, the hardness of the back metal layer 12 is equal to or more than 0.9 times the hardness of the bearing alloy layer 11. On the other hand, in Example 9, the hardness of the back metal layer 12 is less than 0.9 times the hardness of the bearing alloy layer 11. Further, in Comparative Example 4, the hardness of the back metal layer 12 exceeds 240 HV. Each of Comparative Example 5 and Comparative Example 6 is an example in which the hardnesses of the bearing alloy layer 11 and the back metal layer 12 are insufficient. As explained in the aforementioned manufacturing method, the hardnesses of the bearing alloy layer 11 and the back metal layer 12 in each of Example 5 to Example 9 and Comparative Example 4 to Comparative Example 6 are controlled by the amount of change of the thickness when the bearing alloy layer 11 and the back metal layer 12 that are laminated are pressurized.

As is obvious from FIG. 5, each of Example 5 to Example 9 exhibited high processibility and sufficient fatigue resistance. In particular, each of Example 5 to Example 8 in which the hardness of the back metal layer 12 is more than or equal to 0.9 times the hardness of the bearing alloy layer 11 achieved both high processibility and sufficient fatigue resistance. On the other hand, in Example 9 in which the hardness of the back metal layer 12 is less than 0.9 times the hardness of the bearing alloy layer 11, the yield for ensuring suitable dimensional accuracy and roundness decreased although sufficient fatigue resistance was exhibited. This is because the hardness of the back metal layer 12 is lower as compared with the bearing alloy layer 11, and it becomes difficult to ensure accuracy at the time of forming them into the cylindrical shape as the bush member 10.

Furthermore, in Comparative Example 4, processibility was worsened because the hardness of the back metal layer 12 was 248 HV, which is excessively high, and it was difficult to ensure roundness with high dimensional accuracy as the bush member 10. Therefore, Comparative Example 4 was not realized as the bush member 10, and the fatigue resistance was not able to be measured. In each of Comparative Example 5 and Comparative Example 6, the hardnesses of the bearing alloy layer 11 and the back metal layer 12 were insufficient. Therefore, in Comparative Example 5 and Comparative Example 6, the fatigue resistance was insufficient although processibility was ensured.

The present invention described above is not limited to the above-described embodiment and can be applied to various embodiments within the range without departing from the gist of the invention.

The invention claimed is:

1. A bush member for use in a piston pin, comprising:
an Fe-based back metal layer; and
a bearing alloy layer joined to the back metal layer,
wherein the bearing alloy layer
is formed of a Cu-based alloy containing 25 to 45% by mass of Zn, the Cu-based alloy being an alloy of Zn and Cu except for unavoidable impurities, and
has a Vickers hardness of 150 to 230 HV, and
the back metal layer has a Vickers hardness of 160 to 240 HV.

2. The bush member according to claim 1,
wherein the Vickers hardness of the back metal layer is more than or equal to 0.9 times the Vickers hardness of the bearing alloy layer.

3. The bush member according to claim 1, wherein the bearing alloy layer is formed of a Cu-based alloy containing 35 to 45% by mass of Zn.

* * * * *